Figure 1:
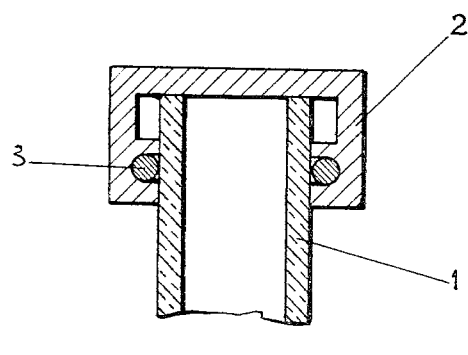

Aug. 24, 1965  A. VELTE  3,202,490

SEALING STRUCTURE

Filed March 5, 1962

INVENTOR:
A. VELTE

BY Paul M. Craig, Jr.
ATTORNEY

United States Patent Office 3,202,490
Patented Aug. 24, 1965

3,202,490
SEALING STRUCTURE
Andre Velte, Paris, France, assignor to CSF-Compagnie Generale de Telegraphie Sans Fil, Paris, France
Filed Mar. 5, 1962, Ser. No. 177,348
Claims priority, application France, Mar. 23, 1961, 856,555
5 Claims. (Cl. 29—195)

The present invention relates to sealing structures, and more particularly relates to structures which comprise pieces made of insulating materials and sealed to metallic pieces which are made of materials representing relatively good conductors of electricity.

According to a prior art method currently used to realize such seals, the insulating piece is metallized before being sealed to the metal. This process, however, presents the inconvenience of comprising several operations of a total duration that is relatively long, of the order of two hours, and to necessitate baking in hydrogen at relatively elevated temperatures, of the order of 1500° C.

There is also known in the prior art a process using titanium or zirconium hydride which is, however, applicable only to pieces of relatively small dimensions and comprises delicate operations, entailing often also soiling of the insulating pieces as well as an imperfect localization of the brazing.

The present invention has as object metal-insulating assemblies and the sealing process corresponding thereto which permits the elimination or considerable reduction of the aforementioned inconveniences.

The present invention also aims at reducing the weight of the vacuum-tight structures comprising insulating-metal seals.

In the assemblies according to the present invention, the metallic piece utilized essentially consists either of pure beryllium or of an alloy containing beryllium.

The sealing process according to the present invention consists in interposing between the metallic piece and the insulating piece to be sealed a sealing member made of a brazing material, placing the assembly into an oven within a good vacuum, of the order of $10^{-5}$ mm. Hg, or within an inert gas, and progressively heating up to the wetting temperature of the brazing material with the insulating material.

Under these conditions, the brazing material ties itself or bonds itself at the same time to the metal and to the insulating material, thereby providing, after cooling, an insulating-metal seal which is sturdy and vacuum-tight.

Accordingly, it is an object of the present invention to provide a method for sealing metallic insulating pieces to thereby provide a vacuum-tight seal and sealing structures resulting therefrom which obviate the disadvantages and shortcomings encountered with the prior art methods and constructions.

It is another object of the present invention to provide a method for sealing metal-insulating assemblies which assures a vacuum-tight and strong seal between the insulating piece and the metallic piece whereby the method is relatively simple, relatively little time-consuming, and avoids the need for baking at relatively high temperatures in hydrogen or the like.

A further object of the present invention resides in the provision of a sealing method and sealing structure resulting therefrom assuring a vacuum-tight seal between an insulating member and an electrically conductive member which may be used with structures of relatively larger dimension and which may be so performed as to avoid substantially any soiling of the pieces involved.

Figure 2:
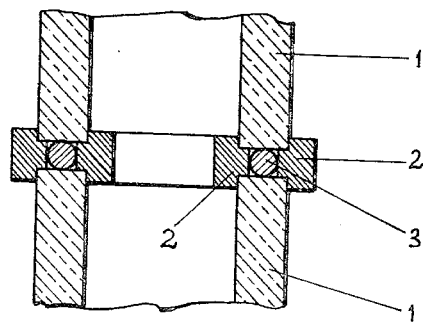

These and further objects, features and advantages of the present invention will become more obvious from the following description when taken in connection with the accompanying drawing which shows, for purposes of illustration only, two embodiments in accordance with the present invention, and wherein FIGURE 1 is a partial cross-sectional view through a first embodiment of an insulating-metal seal in accordance with the present invention, and FIGURE 2 is a partial cross-sectional view of a modified embodiment of an insulating-metal-insulating assembly in accordance with the present invention.

Referring now to the drawing wherein like reference numerals are used throughout the two views to designate corresponding parts, and more particularly to FIGURE 1 which illustrates a sealing assembly in accordance with the present invention, reference numeral 1 designates therein a cylinder of ceramic material, such as magnesia, preferably of electro-molten quality, in compression, and a conductive metallic piece 2 made of beryllium, covering one extremity of the cylinder 1. A brazing member 3, constituted, for example, by an alloy wire such as the eutectic Ag Cu having for its composition Ag=72%, Cu=28% and melting at about 780° C., is located within a groove provided within the metal 2, in contact with the magnesia insulating piece 1, the sides of the two pieces 1 and 2 having been previously adjusted in such a manner as not to leave any play therebetween. The assembly is placed within a good vacuum, of the order of $10^{-5}$ mm. Hg, or within an inert gas into an oven heated progressively up to the point where the assembled pieces reach a temperature of 850° C. approximately.

During this rise in temperature, the brazing alloy melts, thereupon combines with the beryllium to form a new alloy, and the latter, reacting with the magnesia, forms a tight and solid connection between the magnesia and the metal.

FIGURE 2 illustrates a modified structure in accordance with the present invention.

Two cylinders 1 made of magnesia are in contact with the brazing element 3, disposed between two pieces 2 made of beryllium. A stay within the oven under the conditions indicated hereinabove causes the brazing element 3 to melt, which thereupon combines with the beryllium and suitably wets the adjacent surfaces of the two magnesia pieces 1, assuring therebetween a connection or bond which, after cooling, presents the qualities of sturdiness and tightness generally required in vacuum-tube techniques. Additionally, the structure thus realized is characterized by its lightness which presents a very appreciable advantage in certain applications, particularly in electronic equipments to be used in space vehicles.

The invention is not limited to the examples cited as many other dispositions and modifications may be envisaged according to the basic principle exposed hereinabove.

The magnesia may be replaced by any other refractory insulating material, having a coefficient of expansion substantially of the same value as the beryllium or the beryllium alloy used.

As brazing material may also be used materials other than that cited hereinabove, for example, Ag, Cu, Ni, Au, etc., and the alloys thereof, provided the assembly to be sealed is then brought to a temperature sufficient to permit the wetting of the insulating material by the alloy enriched in beryllium in the course of the thermal cycle.

In all cases, the seals realized in accordance with the present invention offer the folowing advantages:

(1) Execution in a single operation without any preliminary treatment such as metallization of the insulating material;

(2) Simplicity, facility, and relatively short duration of the operation, of the order of 10 to 15 minutes;

(3) Lightness of the sealed structures;

(4) Relatively moderate treating temperatures, of the order of 800° C.–1100° C.;

(5) High precision of the sizes of the assembled pieces;

(6) Clean and well-defined brazed joints;

(7) Very good sturdiness and vacuum-tightness;

(8) Possibility of operation at relatively elevated temperatures;

(9) High resistance to mechanical and thermal shocks.

While I have shown and described two embodiments in accordance with the present invention, it is understood that the same is not limited thereto, but is susceptible of many changes and modifications within the spirit and scope thereof.

Additionally, the present invention is also susceptible of numerous other applications, and in particular covers vacuum-tubes constructed according to the present invention, especially those constructed with the aim of considerably reducing the weights thereof.

Thus, it is obvious that the present invention is not limited to the details shown and described hereinabove, and I, therefore, do not wish to be limited thereto, but intend to cover all such changes and modifications as are encompassed by the scope of the appended claims.

I claim:

1. A brazed sealing structure, comprising a ceramic insulating part, a metal part made of a material selected from the group consisting of substantially pure beryllium and beryllium alloys, and a brazing material joining the ceramic insulating part and the metal part, said brazing material being a metal selected from the group consisting of gold, copper, nickel, silver and the alloys thereof.

2. A seal comprising a ceramic part and a metal part hermetically brazed to said ceramic part, wherein said metal is substantially pure beryllium and said ceramic part is magnesia, and wherein said brazing material is a metal selected from the group consisting of gold, copper, nickel, silver and the alloys thereof.

3. A seal comprising a ceramic part and a metal part hermetically brazed to said ceramic part, wherein said metal is substantially pure beryllium, and wherein said brazing material is a metal alloy of gold and copper.

4. A seal comprising a ceramic part and a metal part hermetically brazed to said ceramic part, wherein said metal is selected from the group consisting of substantially pure beryllium, and beryllium alloys, said metal part being provided with a closed annular channel, said ceramic part forming at least one wall of said annular channel, said channel containing a brazing material is a metal alloy of gold and copper forming a hermetic seal between said ceramic part and said metal part.

5. A seal comprising a ceramic part and a metal part hermetically brazed to said ceramic part, wherein said metal is substantially pure beryllium, and wherein said brazing material is a metal selected from the group consisting of gold, copper, nickel, silver and the alloys thereof.

References Cited by the Examiner

UNITED STATES PATENTS

| | | | |
|---|---|---|---|
| 1,716,140 | 6/29 | Kirwer | 29—472.9 |
| 2,130,879 | 9/38 | Dobke | 29—488 |
| 2,175,016 | 10/39 | Brunke | 317—241 |
| 2,175,873 | 10/39 | Brunke | 317—241 |
| 2,296,307 | 9/42 | Power | 29—472.9 |
| 2,386,628 | 10/45 | Nazzewski | 29—195 |
| 2,454,270 | 11/48 | Braunsdorf | 65—69 |
| 2,775,531 | 12/56 | Montgomery | 29—195 |
| 2,798,577 | 7/57 | La Forge | 29—195 |
| 2,857,663 | 10/58 | Beggs | 29—195 |
| 2,859,562 | 11/58 | Korgelo | 29—195 |
| 2,934,820 | 5/60 | Novak | 29—488 |
| 3,086,284 | 4/63 | Schetky | 29—195 |

OTHER REFERENCES

"Beryllium Joining" by E. M. Passmore, published U.S. Office of Technical Services P.B. 161,831, April 1960, (127 pages in report).

DAVID L. RECK, *Primary Examiner.*

HYLAND BIZOT, *Examiner.*